(12) United States Patent
Jameson

(10) Patent No.: US 8,118,262 B2
(45) Date of Patent: Feb. 21, 2012

(54) HYBRID PARACHUTE

(75) Inventor: Nicholas F. Jameson, Morrison, CO (US)

(73) Assignee: Pioneer Astronautics, Lakewood, CO (US)

( * ) Notice: Subject to any disclaimer, the term of this patent is extended or adjusted under 35 U.S.C. 154(b) by 0 days.

(21) Appl. No.: 11/914,930

(22) PCT Filed: Sep. 21, 2007

(86) PCT No.: PCT/US2007/079210
§ 371 (c)(1),
(2), (4) Date: Jan. 15, 2008

(87) PCT Pub. No.: WO2009/038586
PCT Pub. Date: Mar. 26, 2009

(65) Prior Publication Data
US 2010/0163682 A1    Jul. 1, 2010

(51) Int. Cl.
*B64D 17/08* (2006.01)
(52) U.S. Cl. ....................................................... 244/152
(58) Field of Classification Search .................. 244/145, 244/146, 152
See application file for complete search history.

(56) References Cited

U.S. PATENT DOCUMENTS

| | | | |
|---|---|---|---|
| 2,371,898 A * | 3/1945 | Lisi ................................ 244/152 |
| 2,566,585 A * | 9/1951 | Smith ............................. 244/152 |
| 3,218,007 A * | 11/1965 | Gross ............................. 244/145 |
| 3,252,676 A * | 5/1966 | Frieder .......................... 244/145 |
| 3,385,539 A | 5/1968 | Ewing et al. | |
| 3,401,905 A * | 9/1968 | Rohrlick ........................ 244/152 |
| 3,428,277 A * | 2/1969 | Everett, Jr. .................... 244/142 |
| 3,498,565 A | 3/1970 | Nash-Boulden | |
| 3,756,547 A | 9/1973 | Snyder et al. | |
| 3,773,284 A * | 11/1973 | Matsuo et al. ................. 244/142 |
| 3,945,592 A * | 3/1976 | Sutton ............................ 244/152 |
| 4,022,406 A | 5/1977 | Matsuo | |
| 4,065,079 A | 12/1977 | Winchurch | |
| 4,846,423 A | 7/1989 | Reuter | |
| 5,248,117 A | 9/1993 | Hennings | |
| 5,893,536 A * | 4/1999 | Lee et al. ....................... 244/149 |
| 6,199,800 B1 | 3/2001 | Coe | |
| 6,520,453 B1 * | 2/2003 | Sadeck .......................... 244/145 |
| 6,669,146 B2 * | 12/2003 | Lee et al. ....................... 244/145 |
| 6,886,785 B2 * | 5/2005 | Preston .......................... 244/145 |
| 2003/0038215 A1 | 2/2003 | Benney et al. | |
| 2004/0016851 A1 | 1/2004 | Preston | |

* cited by examiner

*Primary Examiner* — Galen Barefoot
(74) *Attorney, Agent, or Firm* — Swanson & Bratschun, L.L.C.

(57) ABSTRACT

A hybrid parachute, method of deploying a parachute and method of landing a payload. The hybrid parachute utilizes a reefing system that provides for the initial deployment of a deceleration stage that is configured to withstand the stresses of high-speed and/or high altitude openings. The deceleration stage has operating characteristics similar to known high-speed parachutes. After sufficient deceleration has been achieved with the deceleration stage, reefings are released deploying one or more low-speed high drag stages of the device. The high drag stage(s) provide the landing characteristics of a low-speed parachute, including the possibility of controlled descent and landing.

28 Claims, 12 Drawing Sheets

Fig. 4 Isometric view of semi-reefed hybrid parafoil.

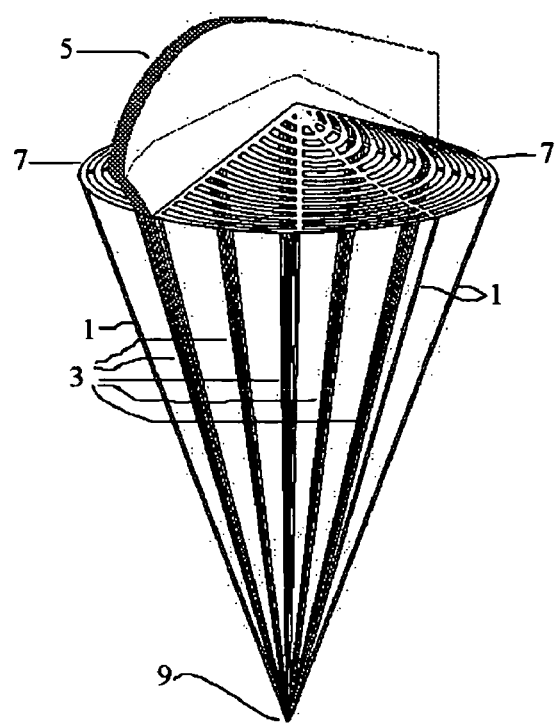
Fig. 1 Isometric view of fully-reefed hybrid parafoil.
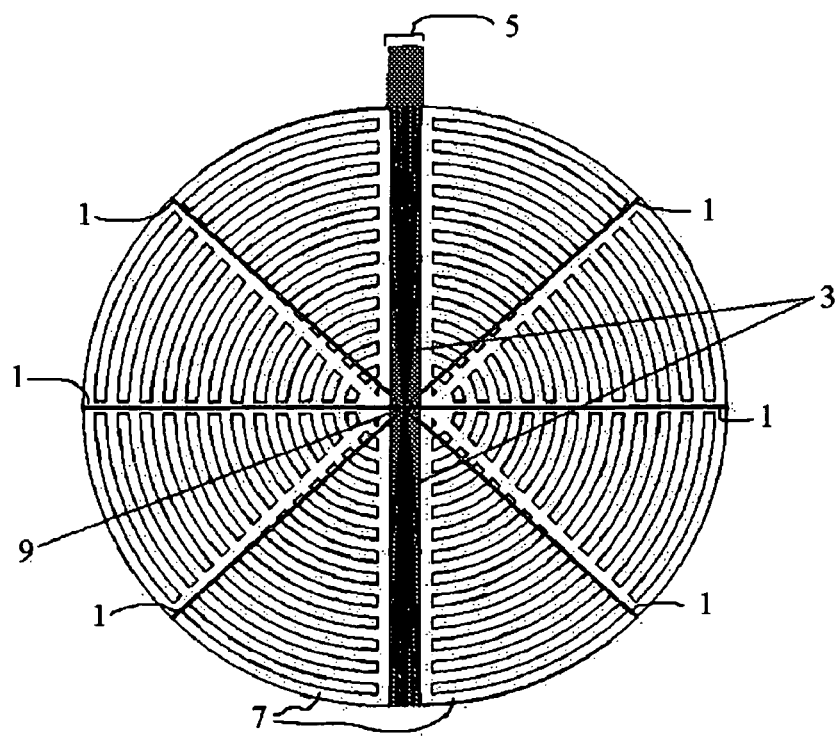
Fig. 2 Bottom view of fully-reefed hybrid parafoil.

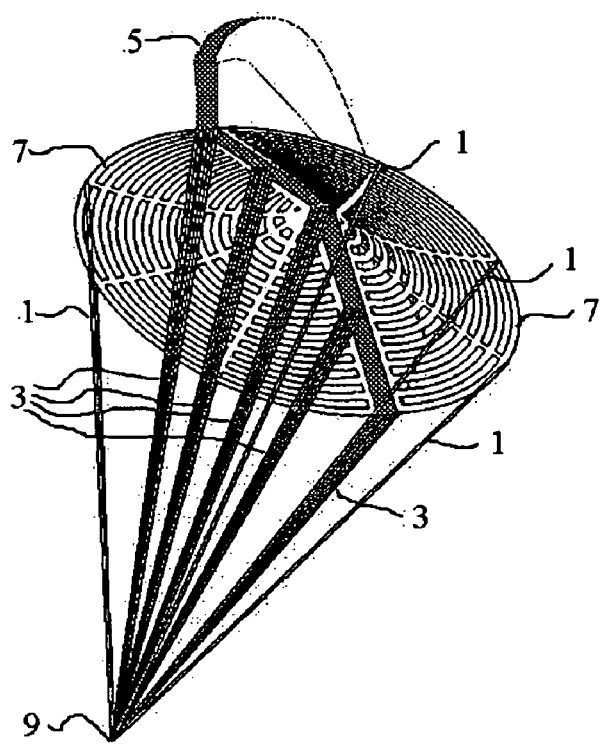
Fig. 3 Isometric bottom view of fully-reefed hybrid parafoil.
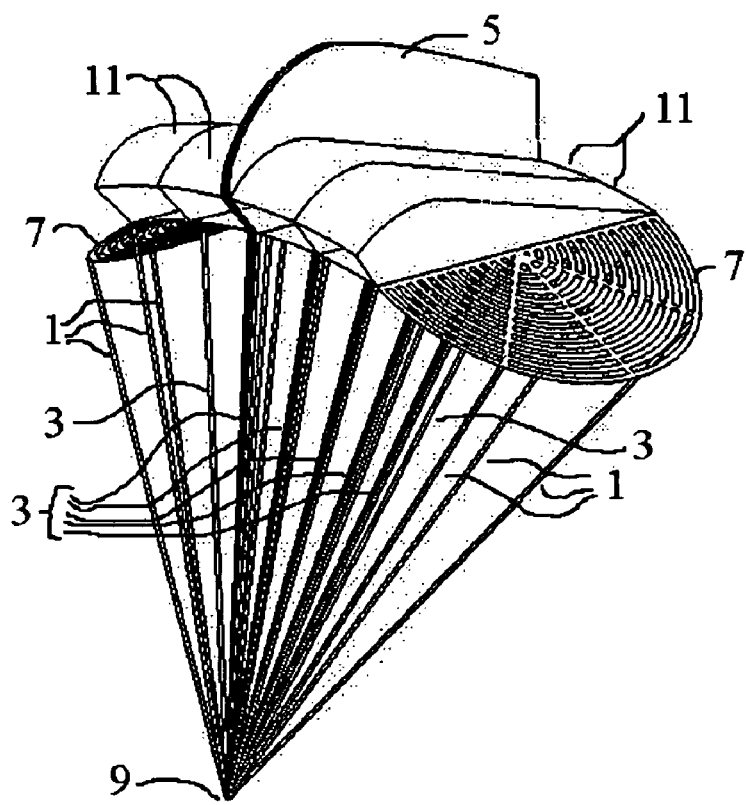
Fig. 4 Isometric view of semi-reefed hybrid parafoil.

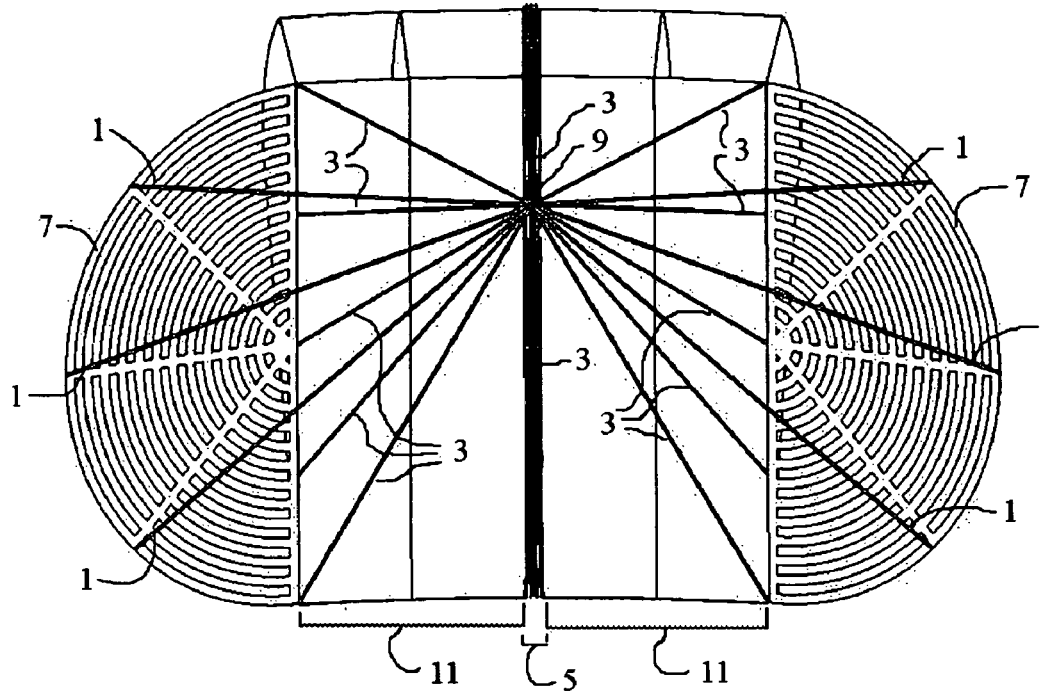
Fig. 5 Bottom view of semi-reefed hybrid parafoil.
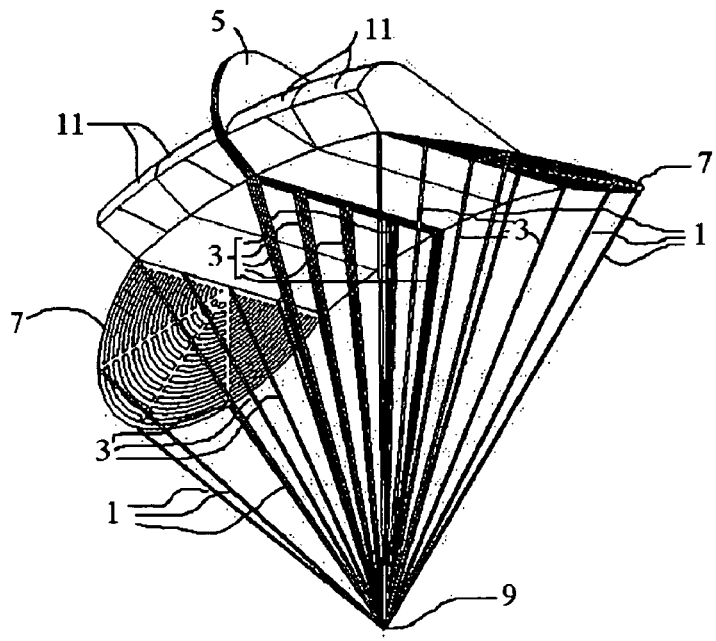
Fig. 6 Bottom isometric view of semi-reefed hybrid parafoil.

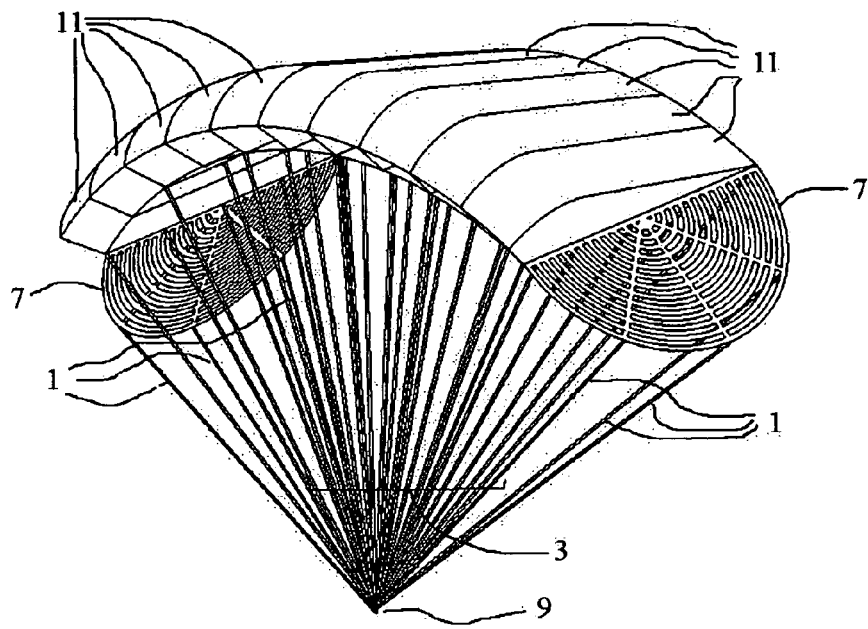
Fig. 7 Isometric view of fully-deployed hybrid parafoil.
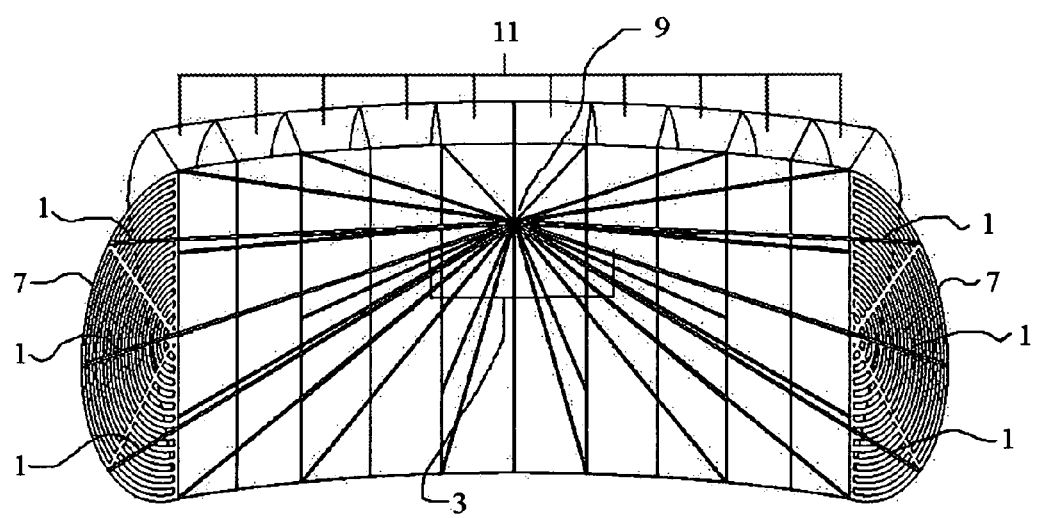
Fig. 8 Bottom view of fully-deployed hybrid parafoil.

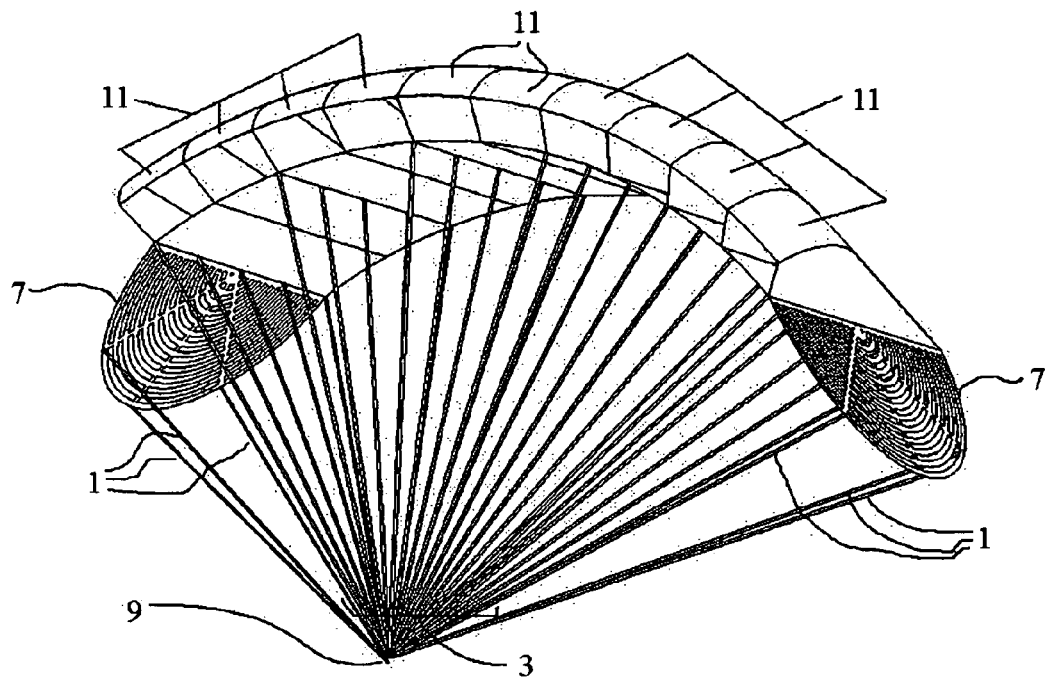
Fig. 9 Bottom isometric view of fully-deployed hybrid parafoil.
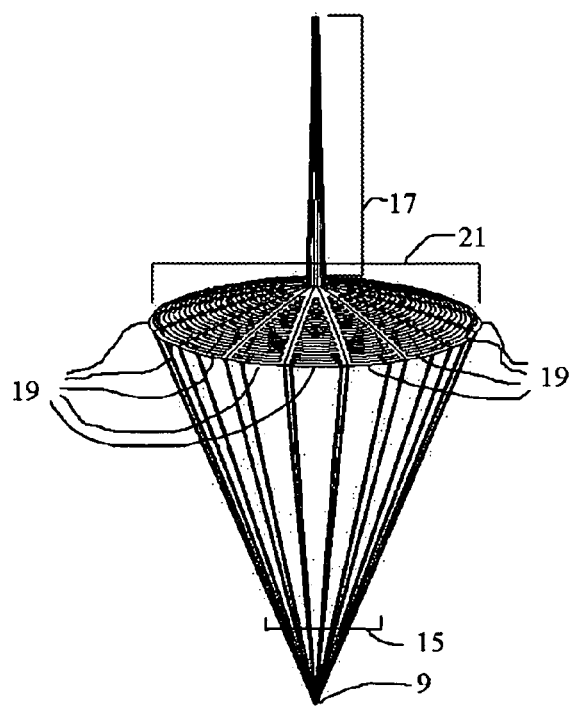
Fig. 10 Isometric view of fully-reefed hybrid conical parachute.

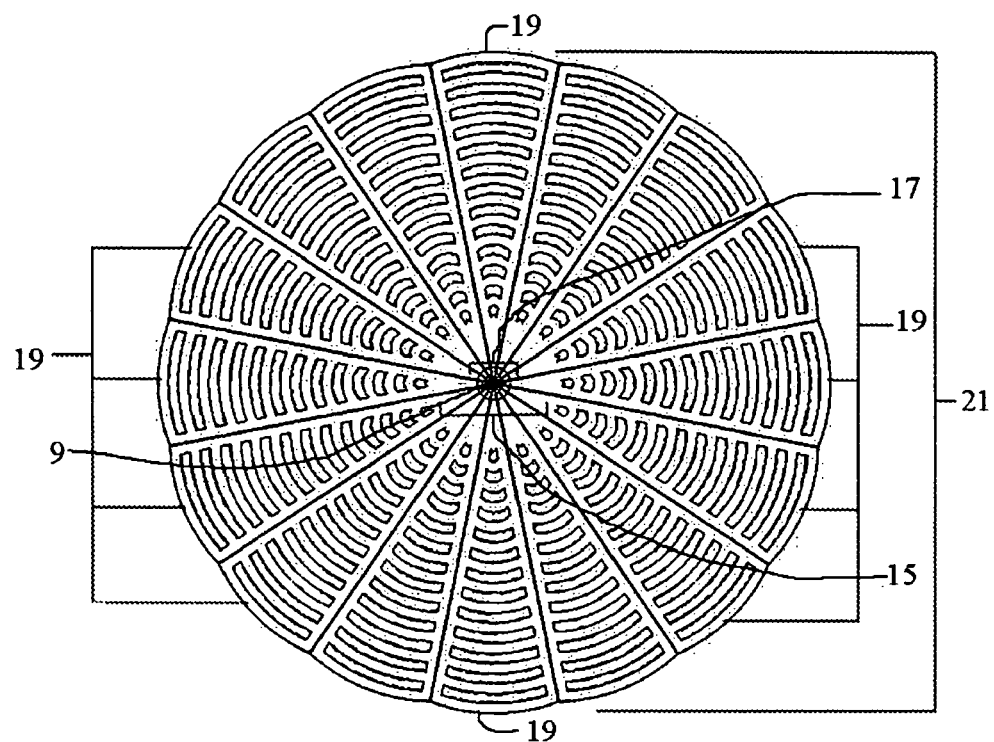
Fig. 11 Bottom view of fully-reefed hybrid conical parachute.
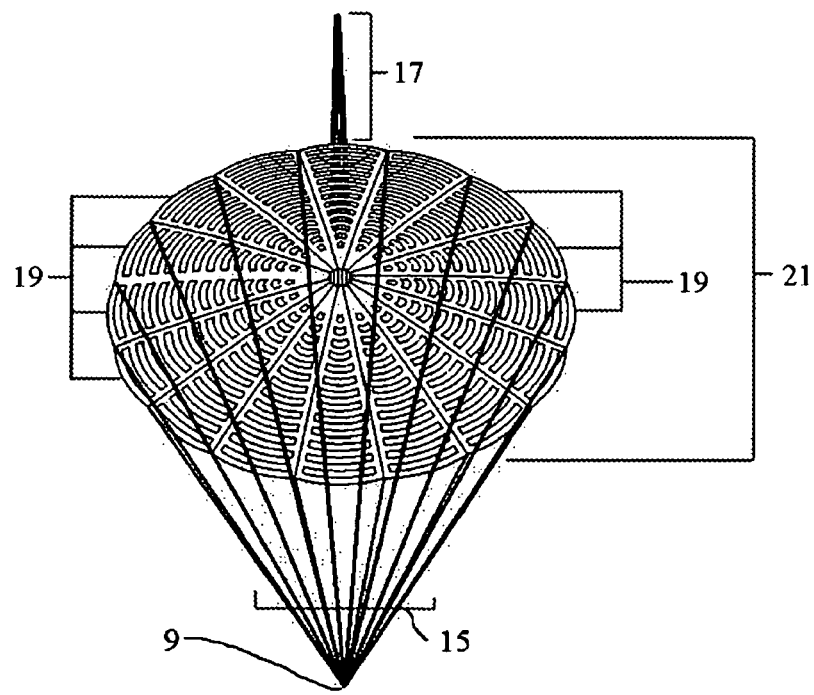
Fig. 12 Bottom isometric view of fully-reefed hybrid conical parachute.

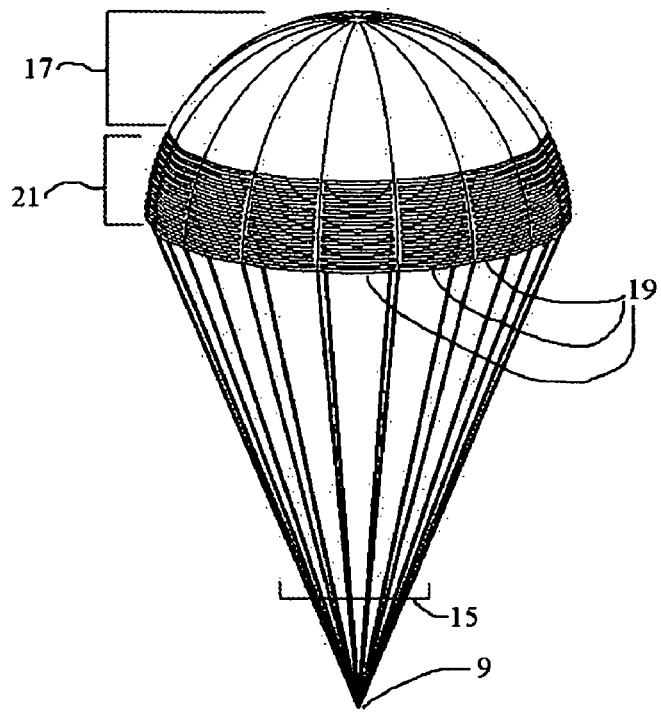
Fig. 13 Isometric view of fully-deployed hybrid conical parachute.
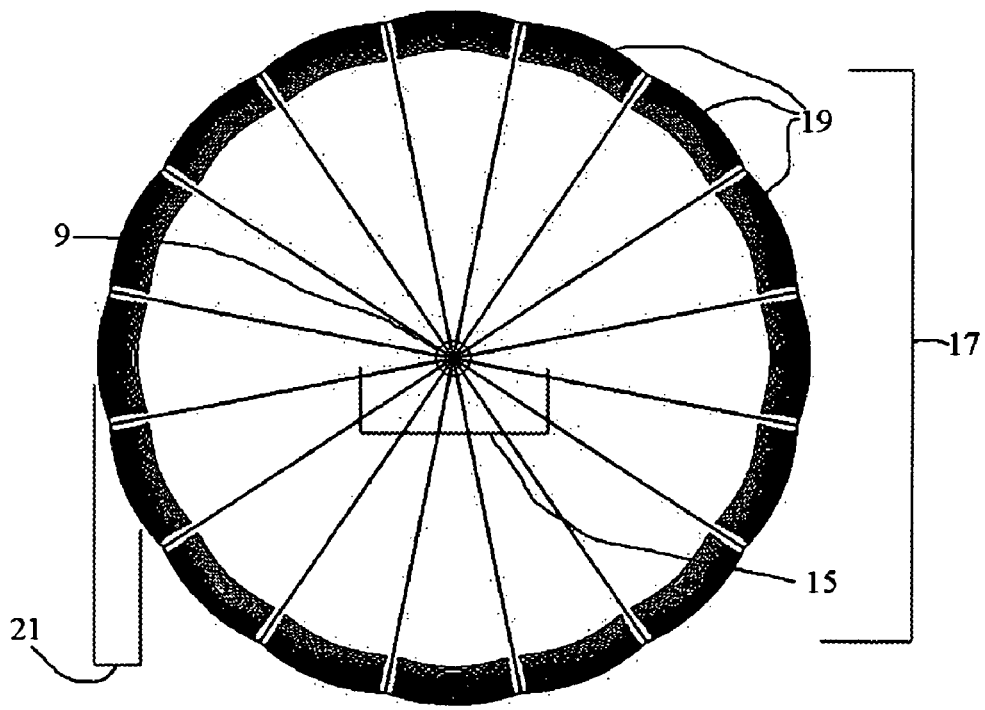
Fig. 14 Bottom view of fully-deployed hybrid conical parachute.

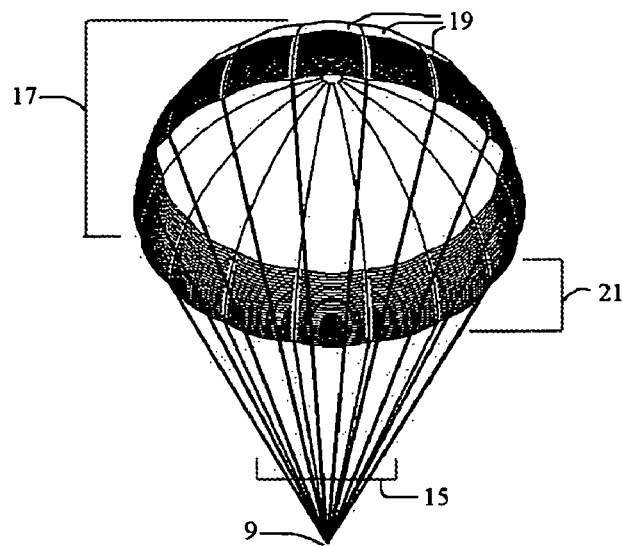
Fig. 15 Bottom isometric view of fully-deployed hybrid conical parachute.
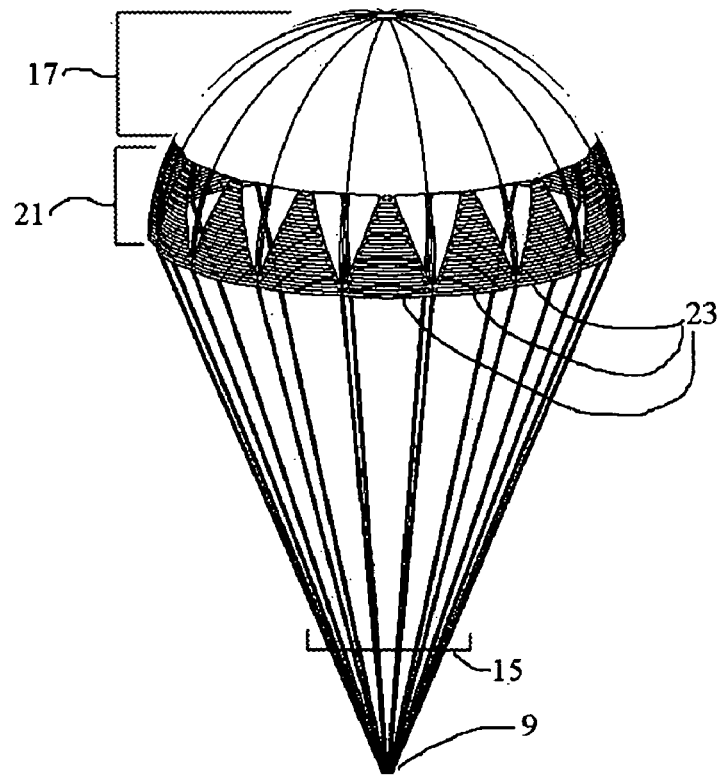
Fig. 16 Isometric view of fully-deployed hybrid conical parachute with modified high-speed-stage gore form.

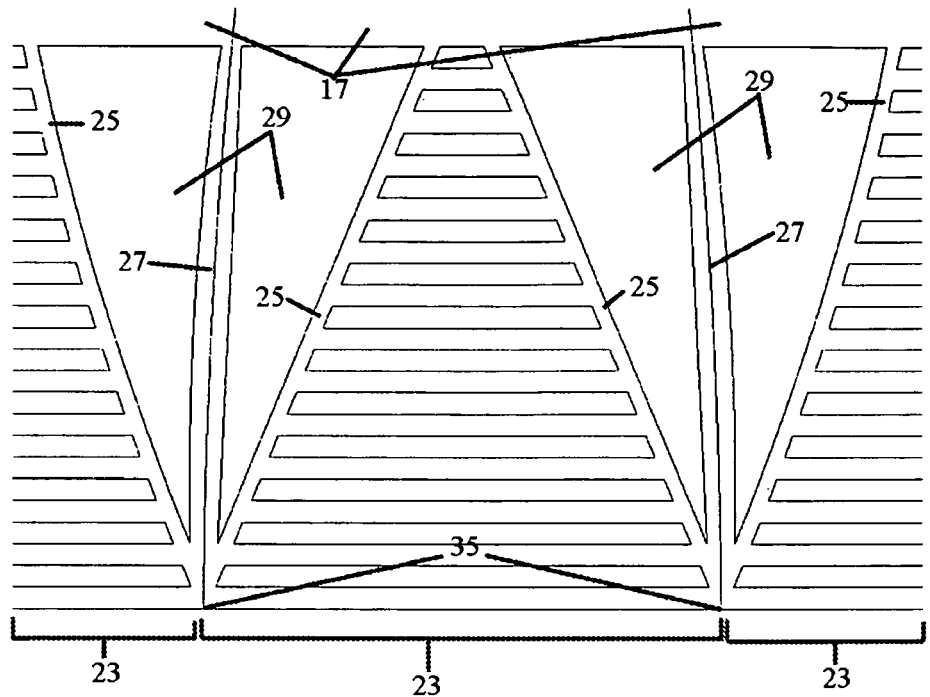
Fig. 17 Close-up view of modified gore of the high speed stage of hybrid conical parachute.
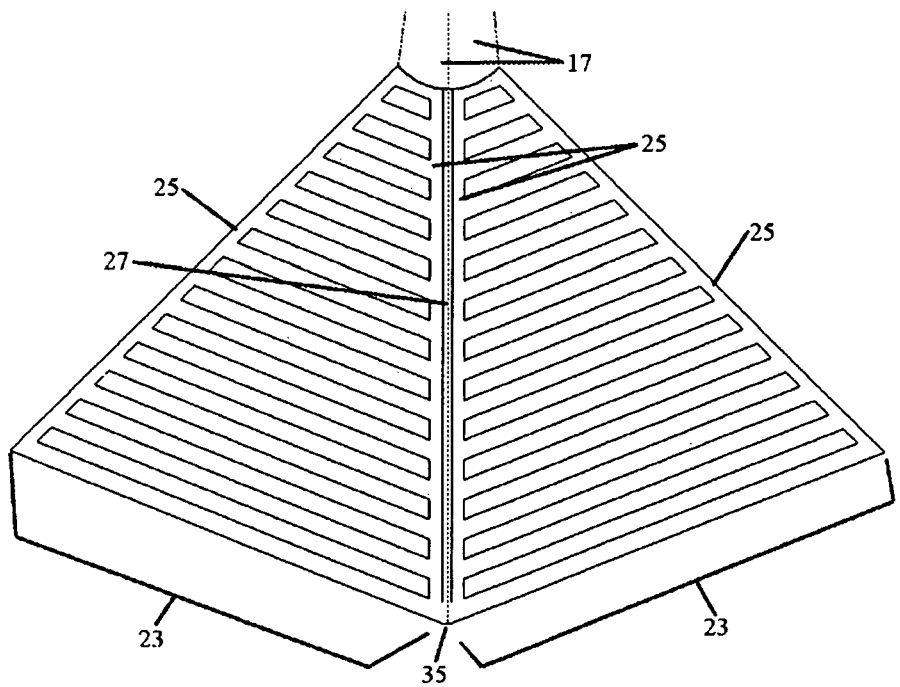
Fig. 18 Close-up view of modified gore of the high speed stage of hybrid conical parachute in the reefed position.

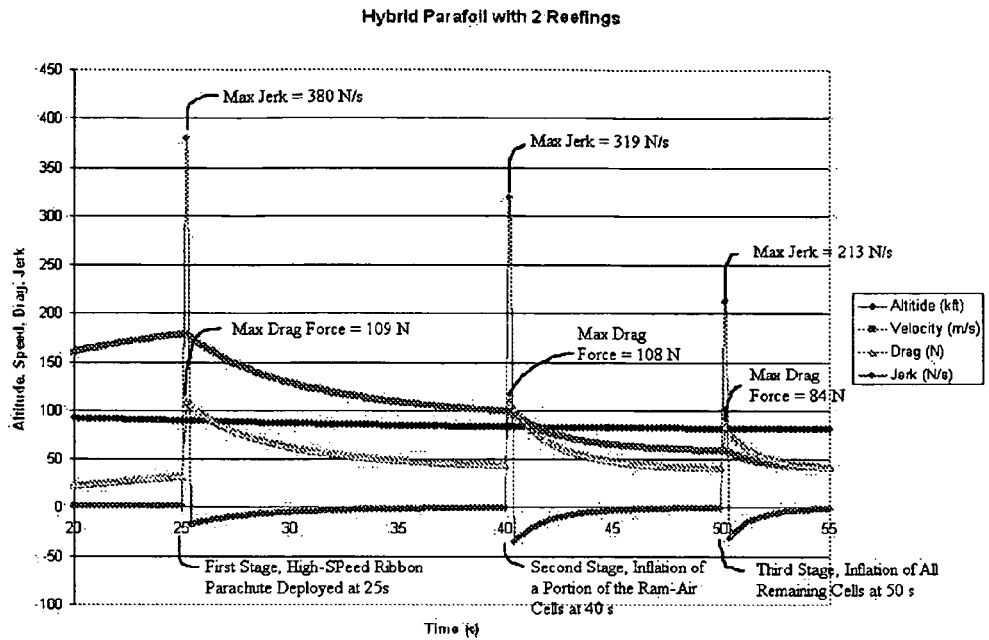
Fig. 19 Forces endured by 3-stage parafoil hybrid. Max jerk is approximately 380 N/s and max drag force is approximately 108 N.
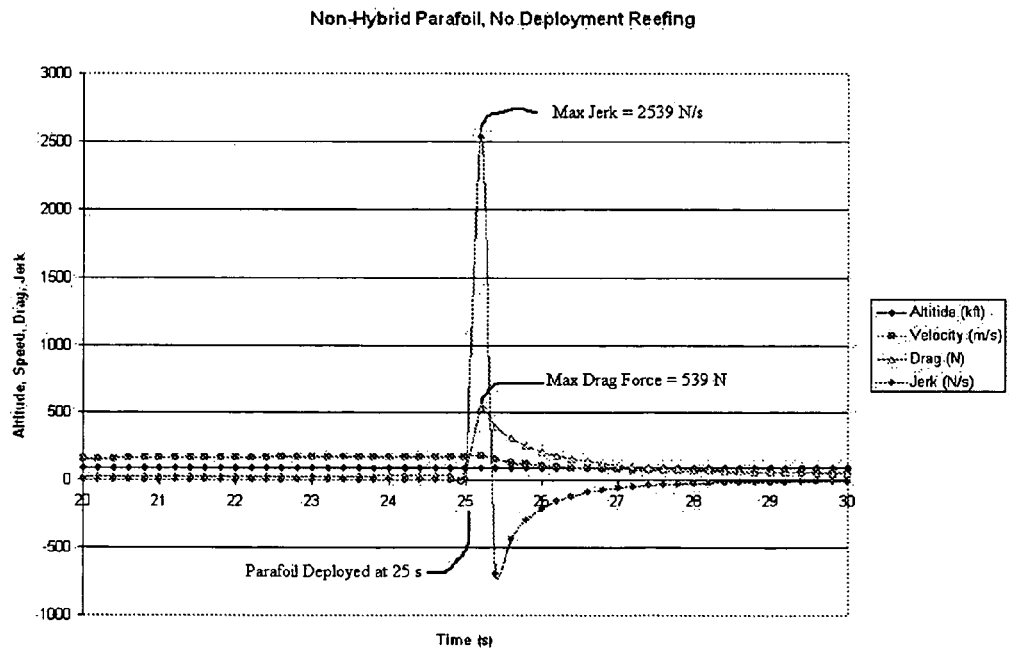
Fig. 20 Forces endured by unreefed, non-hybrid parafoil. Max jerk is approximately 2,528 N/s and max drag force is approximately 538 N.

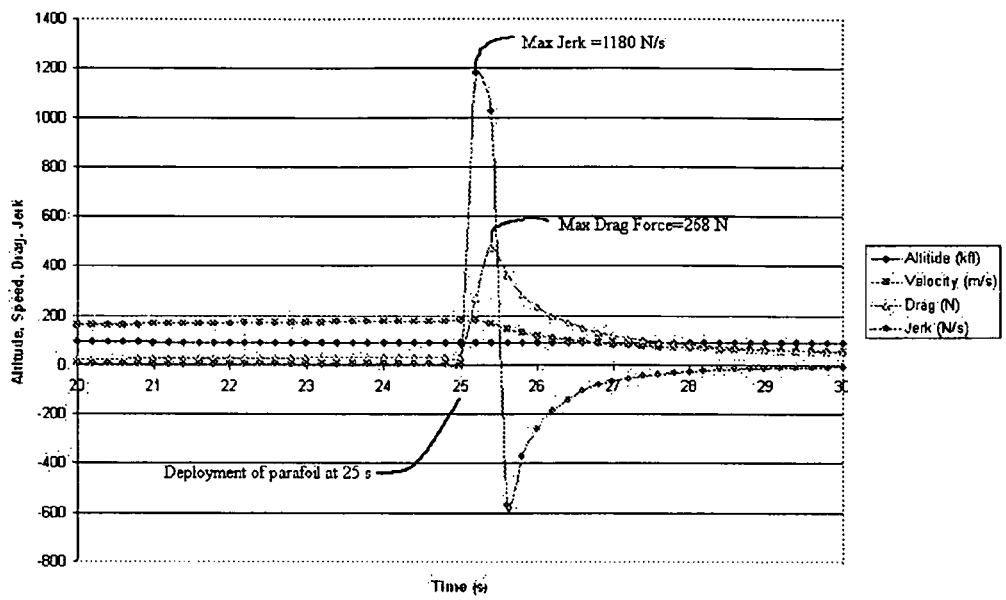
Fig. 21 Forces endured by slider-reefed, non-hybrid parafoil. Max jerk is approximately 1,181 N/s and max drag force is approximately 269 N.
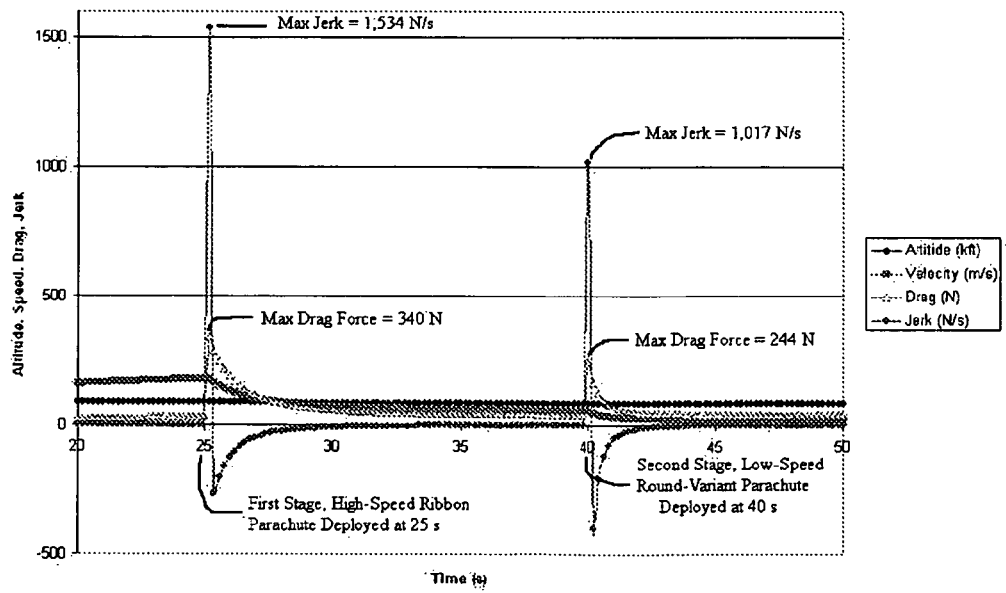
Fig. 22 Forces endured a hybrid round-variant parachute. Max jerk is approximately 1,534 N/s and max drag force is approximately 340 N.

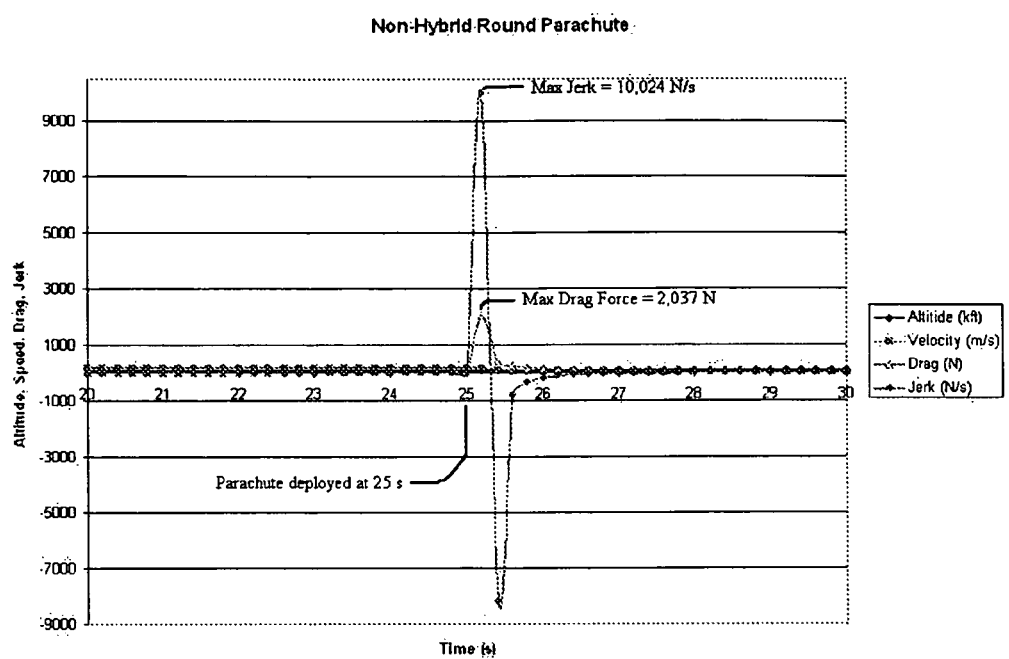
Fig. 23 Forces endured an unreefed, non-hybrid round-variant parachute. Max jerk is approximately 10,024 N/s and max drag force is approximately 2,037 N.

HYBRID PARACHUTE

TECHNICAL FIELD

A parachute design for use in high speed or thin atmospheric conditions. More particularly, a staged parachute that can also be used for high mass payloads deployed at high altitude or high speed featuring an initial decelerator stage and at least one high drag stage which may be controllable.

BACKGROUND

It has long been desirable to have a parachute system that can be deployed at high speeds and/or high altitudes, which can also safely deliver a payload to the surface of the Earth or an extraterrestrial planet. Historically, parachutes have generally been divided into two main categories:

High-speed parachutes, which can be deployed at speeds generally higher than 0.5 Mach. Known high speed parachutes are limited in their usage because they provide low drag and are generally not controllable. Examples of high-speed parachutes include, but are not limited to: ballutes, ribbon, guide surface and ringslot parachutes.

Low-speed parachutes, which cannot be deployed at speeds generally higher than 0.5 Mach. Examples of low-speed parachutes include, but are not limited to: parafoils, solid-textile round-variant parachutes, slotted or vented round variants, cruciforms, rotafoils and parawings.

The low-speed parachute category can further be subdivided into maneuverable and non-maneuverable parachutes. Maneuverable parachutes include parafoil, parawing and some slotted or vented round parachute variants.

Both high-speed and low-speed parachutes have respective intrinsic utilities and weaknesses. For example, maneuverable low-speed parachutes have the ability to provide control over the landing point of the payload, while also affording some control of the descent and landing speed of the payload. These parachutes are limited, however, due to this design's tendency to structurally fail at very high speeds and/or very high altitudes.

Non-maneuverable low-speed parachutes can have high drag, allowing for soft landings. These variants however, in addition to being non-maneuverable, exhibit some of the same weakness as the maneuverable low-speed parachutes, in particular non-maneuverable low speed designs also may structurally fail when deployed at high speeds or high altitudes.

High-speed parachutes may be deployed at high speeds and high altitudes. Known high-speed parachutes generally do not have the capacity to create high drag, nor are they significantly maneuverable. Therefore, high-speed designs cannot be precision controlled nor can they land a payload as softly as a low-speed deployable parachute.

Many known parachute systems require dual parachutes with an initial supersonic or high-speed drogue used to slow the payload to speeds suitable for the deployment of a second low-speed parachute, which may be a maneuverable parachute, a high-drag round-parachute variant or any other type of high-drag parachute. Such systems may be unsuitable for a given use due to the complexity of a two-parachute system and the resulting increased risk of improper operation or failure.

The present invention is directed toward overcoming one or more of the problems discussed above.

SUMMARY OF THE EMBODIMENTS

One embodiment disclosed herein is a hybrid parachute utilizing a reefing system that allows it to be initially deployed in a decelerator form that is configured to withstand the high stresses of high-speed and/or high altitude openings. The deceleration stage has the operating characteristics of known high-speed parachutes. After sufficient deceleration has been achieved with this stage, reefings are released deploying one or more low-speed high drag stages of the device. The high drag stage(s) provide the landing characteristics of a low-speed parachute, including the possibility of controlled descent and landing.

The disclosed embodiment thus deploys in at least two distinctive stages, separated by a reefing system. The reefing will be placed in such a way as to maintain all subsequent stage(s) of the parachute effectively out of the airstream, prior to deployment.

Because the system will initially deploy in the form of a high-speed system, it will provide the functionality of known high-speed parachute designs. The deceleration stage will thus be configured to withstand opening forces in the same manner as a conventional high-speed parachute. The deceleration stage will slow the system and payload down to a speed suitable for the deployment of a low-speed high drag stage. The decelerator stage may be configured as a solid textile, ribbon, guide to surface, ringslot, ballute, or any other high speed deployable design.

The second stage, which was previously maintained out of the airstream, performs the function of a low-speed high drag parachute. When the deceleration stage has slowed the payload sufficiently to allow for second or subsequent stage deployment, one or more reefings between the stages may be released, allowing for the opening of the high-drag stage or stages. Upon deployment of the high drag stage, the system will have the flight characteristics of a low-speed system, including the possibility of controlled flight and landing.

The disclosed embodiments are a technological solution to the problems faced by conventional parachute system delivery for high-altitude and/or high-speed terrestrial uses as well as for use landing payloads on extraterrestrial planets. The technical innovations of the system disclosed herein include but are not limited to:

1. Hybridizing a high-speed parachute design with a low-speed parachute design for deployment in two or more separate stages. The disclosed systems thus have all the beneficial characteristics of a high-speed parachute, including reliable opening under extreme conditions.
2. The use of a reefing system to maintain the parachute during the initial deployment stages in the shape of a high-speed parachute, which facilitates deployment at very high speeds and in thin atmospheric conditions. After sufficient slowing occurs, the reefing may be released allowing the low-speed stage(s) to be deployed. The parachute thus has all the beneficial characteristics of a low-speed parachute, including the capacity to provide controlled soft landings.
3. The disclosed system is therefore also completely deployable in thicker atmospheres or at lower deployment speeds as the reefing stages can be released when appropriate speeds are reached; immediately if the payload is falling relatively slowly.

As a result of the innovations described herein, the hybrid parachute may provide soft and precision landing of payloads from high altitudes with the use of a single parachute system.

Alternative embodiments disclosed herein include a method of deploying a parachute. The method includes deploying a decelerator stage initially, followed by the deployment of a high drag stage attached to the decelerator stage. The method may include releasing one or more reefings between the decelerator stage and the high drag stage to deploy the high drag stage. Either the decelerator stage or the high drag stage may be deployed in multiple sub-stages. The timing between the deployment of the decelerator stage and the high drag stage may be controlled. Timing control may be provided by devices including, but not limited to, an autonomous system, a remote control system or a manual system. The deployment speed may be further controlled through the use of a slider. Similarly, operation of the parachute after deployment of either the decelerator stage or the high drag stage may be controlled with devices including, but not limited to, an autonomous system, a remote control system or a manual system.

Another embodiment disclosed herein includes a method of landing a payload. The method of landing a payload includes attaching a payload to a parachute as described above and deploying the parachute as described above.

There are many uses for a parachute system that can be deployed at high speed or high altitude, but which also has one or more low-speed deployable stages. In applications requiring precision air drop delivery, parafoils are already being used, but a low-altitude, low-speed deployment is forced upon the user. For some applications this is acceptable, but in others, particularly military systems, this poses grave difficulties. For example, the United States Marines currently engaged in Iraq make extensive use of the Sherpa parafoil system to deliver resupply of munitions to forward units. The Sherpa, however, cannot typically be deployed at altitudes above 10,000 feet, exposing the slow-moving low-altitude delivery aircraft to great danger from enemy ground assets. A hybrid parafoil such as disclosed herein which may be deployed from 40,000 ft by transonic aircraft would thus have enormous military utility, enabling resupply of remote units without exposing pilots and aircraft to the threat of ground fire from the enemy's numerous small-scale anti-aircraft weapons.

For reasons of range safety, space launch vehicles are generally launched over water. This makes reuse of expended launch vehicle first stages very difficult. When typical round parachute recovery is employed, the stages must land in the ocean, where they will experience extensive darriage from the marine environment. Space Shuttle solid rocket boosters are recovered for reuse after such oceanic splashdowns; it is, however, estimated that the costs of marine retrieval and refit are sufficiently extensive that NASA would actually save costs by simply letting the boosters sink and procuring new boosters for each launch instead. If high altitude, high-speed deployable hybrid parafoils such as described herein were used instead of conventional round parachutes, the expended booster lower stages could be flown in a controlled fashion back to the launch site, or to an alternative downrange landing strip. In either case, first-stage booster reuse would be much more cost-effective. Since the first stage of any multi-stage launch vehicle is by far the largest, cost-effective booster retrieval is an operational capability which is a key step required towards the achievement of low cost space launch.

Similarly, significant cost saving would be realized by persons utilizing sounding rockets or high altitude balloons if the associated payloads could be recovered by parafoils such as those disclosed herein which are capable of flying the payload back from high altitude in a controlled way to a designated landing site. In summary, the embodiments disclosed herein can provide significant cost and operational advantages over round parachutes which can only land payloads at uncontrolled locations in the ocean or wilderness, after which expensive search and retrieval operations plus extensive marine damage refurbishment are required.

BRIEF DESCRIPTION OF THE DRAWINGS

Two alternative embodiments of the disclosed hybrid parachute will be described in detail herein. Those skilled in the art will recognize that alternative designs can be made which are within the scope of the present disclosure.

FIG. 1 represents an isometric view of a parafoil high drag stage which has been combined with a conical ribbon deceleration stage to form a hybrid parachute in accordance with one embodiment disclosed herein. The plurality of longitudinal cells of the high drag stage are initially accordion folded and the lateral extremes, i.e. the stabilizers, have been modified to be the corresponding sides of a conical ribbon deceleration stage. Note that the lines from the rear of the parachute have been shortened in the reefing stage in such a way to promote symmetry of the parachute system. These shortened lines are released with the reefing stage as described in detail below.

FIG. 2 represents the hybrid parafoil of FIG. 1 shown from a bottom view.

FIG. 3 represents the hybrid parafoil of FIGS. 1 and 2 shown from a bottom isometric view.

FIG. 4 represents an isometric view of the hybrid parafoil of FIGS. 1, 2 and 3 in a semi-reefed state. The reefing holding the parafoil cells represented in FIG. 1 has been cut, allowing a portion of the cells to inflate. Some of the cells are maintained in their accordion folded state by a secondary reefing.

FIG. 5 represents a bottom view of the hybrid parafoil of FIG. 4.

FIG. 6 represents a bottom isometric view of the hybrid parafoil of FIGS. 4 and 5.

FIG. 7 represents the hybrid parafoil of FIGS. 1 through 6, in a fully inflated, unreefed state. The secondary reefing has been released allowing all of the parafoil cells to inflate.

FIG. 8 represents a bottom view of the hybrid parafoil of FIG. 7.

FIG. 9 represents a bottom isometric view of the hybrid parafoil of FIGS. 7 and 8.

FIG. 10 represents an isometric view of another embodiment featuring a round-variant high drag stage which has been combined with a conical ribbon deceleration stage to form a hybrid parachute consistent with the present invention. The round variant high drag stage has had its skirt extended and/or modified to form the conical ribbon deceleration stage. The figure shows this embodiment with a reefing between the ribbon parachute component and the solid textile component of the parachute.

FIG. 11 represents a bottom view of the embodiment of FIG. 10.

FIG. 12 represents a bottom isometric view of the embodiment of FIGS. 10 and 11.

FIG. 13 represents the embodiment of FIGS. 10 through 12 in a fully unreefed state, i.e. after the reefing between the two component stages has been released.

FIG. 14 represents a bottom view of the embodiment of FIG. 13.

FIG. 15 represents a bottom isometric view of the embodiment of FIG. 13.

FIG. 16 represents an isometric view of an alternative embodiment of the parachute shown in FIGS. 11-15 wherein the high speed stage gores have been modified to interconnect more effectively with adjacent gores in a deceleration stage.

FIG. 17 represents a close-up view of a modified gore which has been shaped to provide for the more effective interconnection of adjacent gores in a deceleration stage.

FIG. 18 represents an isometric view of the modified gores of FIG. 17 when reefed in a deceleration stage.

FIG. 19 graphically illustrates the forces involved in opening the hybrid parafoil of FIG. 1-9 over deployment time. The graph shows the forces at each stage of deployment of the hybrid parafoil system. The deployment stages referenced are the same as those represented in FIGS. 1, 4 and 7.

FIG. 20 represents the forces involved in opening a prior art parafoil with no hybrid design or reefing.

FIG. 21 represents the forces involved in opening a parafoil with no hybrid design but having a solid-textile slider style reefing in place.

FIG. 22 graphically illustrates the forces involved in opening the embodiment of FIG. 10-15 using a two stage hybrid design. The reefing was placed between the ribbon parachute (deceleration) stage and the solid textile round (high drag) stage. The two stages of deployment are as shown in FIGS. 10 and 13.

FIG. 23 represents the forces involved in opening a solid textile parachute with no reefing.

DETAILED DESCRIPTION

The embodiments disclosed herein are directed to a parachute system that can be deployed in a much broader range of conditions than were previously possible. Embodiments are shown which allow for the combined functionality of a low-speed parachute, including controllability and high drag, as well as the robustness and versatility of a high-speed parachute.

FIGS. 1 through 9 illustrate a first hybrid parachute system. This system is a hybrid of a parafoil and a conical ribbon parachute.

Referring to FIGS. 1 through 3, the first disclosed embodiment includes a plurality of accordion folded ram-air inflation cells 5, and the corresponding parafoil lines 3, joined to corresponding sides which are configured as a high-speed deceleration stage 7. The corresponding high-speed parachute lines 1 are also shown and can be connected to a payload at one or multiple points 9. FIGS. 1-3 show the first embodiment in an initial deployment state, for example when the payload is traveling at a high velocity or at high altitude. FIGS. 1 through 3 thus show a first embodiment in a deceleration stage.

FIGS. 4-6 show the inflation of a select number of the plurality of ram-air inflation cells whereby some of the cells are inflated 11 and some remain accordion folded 5. All of the aforementioned cells are connected to corresponding sides which are configured as a deceleration stage 7. The lines 1, 3 can be connected to a payload at one or multiple points 9.

The FIG. 4-6 level of deployment is suitable for intermediate velocities, after the payload has been slowed initially, but before a suitable speed for full parafoil deployment has been reached.

FIGS. 7-9 show the inflation of all of the plurality of ram-air inflation cells 11. Such that the lines 1, 3 can be connected to a payload at one or multiple points 9. At this high drag stage, full low velocity control is available for landing the payload. As shown in FIGS. 7-9 the ram-air inflation cells 11 may include baffles or other structures to maintain self-pressurization during descent. Cross-bracing may further be provided between the longitudinally arranged cells to maintain the structural integrity and/or improve airfoil shape of the ram-air inflatable airfoil.

FIGS. 10 through 15 illustrate an alternative hybrid system. This system is a hybrid of a solid-textile, round variant parachute with a conical ribbon parachute FIGS. 10-12 show the high drag stage 17 effectively reefed out of the air stream with the skirt extended and/or modified to form a conical ribbon parachute 21 deceleration stage having multiple gores 19. In the deceleration stage there is a reefing in place between the two sections 21 and 17. The lines 15 connect to the gores 19 such that the opposing end of the lines can be connected to a payload at one or multiple points 9. The FIG. 10-12 configuration is suitable for high-speed deployment as a deceleration stage.

FIGS. 13-15 show the fully deployed high drag stage round-variant parachute 17 of FIGS. 10-12. Lines 15 connect to the gores 19 on one end and to a payload at one or multiple points 9. In the FIGS. 13-15 high drag stage, this embodiment is suitable for low-speed high-drag situations, for example, after initial slowing of the payload in the FIGS. 10-12 deceleration stage has occurred.

The fully developed high-drag stage round-variant parachute 17 of FIGS. 13-15 features a skirt having multiple gores 19 which are substantially rectangular in shape. As described above, the skirt may be extended and/or modified to form a conical ribbon parachute 21 deceleration stage. The rectangular gores 19 of the FIGS. 13-15 embodiment may not, however, provide for the most effective coupling or interconnection of adjacent gores during high-speed deployment as a deceleration stage. Accordingly, the gore shape may be modified to provide for better interconnection. For example, FIG. 16 shows a fully deployed high drag stage round-variant parachute 17 wherein the gore 23 shape has been modified so as to provide for the better interconnection of each gore 23 to the adjacent gores 23 without causing deformation or irregularities of the parachute shape when the parachute is deployed in an initial deceleration stage, for example as shown on FIGS. 11-12. The lines 15 connect to the gores 23 such that the opposing end of the lines can be connected to a payload at one or multiple points 9. The modified gores 23 of FIG. 16 are substantially triangular in shape. Various other shapes or forms, including truncated triangles, trapezoids or, in certain instances, irregular shapes, may be used to provide for specifically desired interconnection of each gore 23 in a deceleration stage.

FIG. 17 shows a more detailed plan view of a series of modified gores 23 as shown in FIG. 16. The lower edge of the high-drag stage 17 is illustrated at the top of the FIG. 17 view. Each modified gore 23 is shaped as a slightly truncated triangle. Thus, adjacent gores 23 define openings 29 in between gores 23. The openings are configured to effectively allow the sides 25 of each gore 23 to join with sides 25 of adjacent gores 23 at the load-bearing extension 27 superior to the line attachment points 35, to form a deceleration stage. See, for example, the configuration of FIGS. 10-12.

FIG. 18 illustrates two adjacent gores 23 as illustrated in FIGS. 16 and 17 reefed for deployment as a high-speed deceleration stage. It may be observed on FIG. 18 that the triangular gores 23 enhance interconnection into an overall shape which is suitable for the desired deceleration stage.

Each embodiment of the present invention is designed to enable the control of a parachute system in a wider range of conditions than was previously possible. For example, in the first non-exclusive embodiment, the two halves (the right and left half if bisected symmetrically from front to back) of a round-variant high-speed parachute, e.g. a conical ribbon parachute, are created from each of the traditional parafoil stabilizers. Therefore, when the parafoil is completely accordion folded in the spanwise direction, the parafoil is effectively removed from the airstream leaving only the high-speed variant inflated in the airstream. By reefing the parafoil in this manner, a high-speed low-drag deceleration stage is produced. Line lengths for the rear of the parafoil can selectively be shortened with the reefing to aid in maintaining fore-aft symmetry. When deployed in this configuration, the hybrid parafoil does not undergo the forces which would be caused by high-speed deployment of a conventional parafoil.

When deployed in the deceleration stage as described above and shown on FIGS. 1-3, this embodiment can effectively be self-drogueing and self-stabilizing, decelerating to a deployment speed appropriate for the full parafoil stage. After slowing to an appropriate speed, the reefing can be released allowing the high drag stage to deploy. The high drag parafoil can either be completely deployed by releasing a solitary reefing, deployed more slowly by incorporating a slider into the parafoil design after the release of the solitary reefing, or deployed in stages using multiple reefings. A representative staged deployment is illustrated in FIGS. 4-6 (intermediate stage) and FIGS. 7-9 (final stage).

In the alternative embodiment shown in FIGS. 10-15, the skirt of a solid textile parachute is extended and/or modified to be initially deployed in a high-speed deceleration stage. When the solid textile high drag stage is completely reefed as shown in FIGS. 10-12, it is effectively removed from the airstream leaving only the deceleration stage inflated in the airstream. By reefing the system in this manner, the solid textile parachute is converted to function at high speed or in high altitude deployment. In the deceleration configuration the system may avoid the extreme forces normally caused by high-speed deployments. The FIG. 10-15 embodiment is effectively self-drogueing and self-stabilizing. After slowing to an appropriate speed, the reefing can be released allowing the high drag solid textile parachute to deploy. The hybrid parachute can either be completely deployed by cutting a solitary reefing or deployed in stages using multiple reefings.

In any of the embodiments described in detail above, or in alternative embodiments which include a deceleration stage and a high drag stage, it may be important in certain situations to control the timing between the opening of the deceleration stage and the high drag stage. As described in detail below, a slider may be used in conjunction with the reefing system to control the opening of the high drag stage. Alternatively, an autonomous system, a remote control system or a manual system may be employed to control the timing of the opening of respective stages. Similarly, it may be important in various embodiments to control the operation of the parachute after either the deceleration or the high drag stage has opened. Operational control as used herein includes, but is not limited to, steering the parachute during descent or controlling the rate of descent. Operational control may be provided with vents, flaps, lines or other structures as are commonly used to provide control with single stage parachute designs. Operational control may be provided by systems including, but not limited to, autonomous systems, remote control systems or manually articulated systems.

While the invention has been particularly shown and described with reference to three embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. For example, the deceleration stage may be configured as a solid textile, ribbon guide surface, ringslot, ballute or any other suitable high speed deployable design, and may be configured to have different shape to better interface with its corresponding parts or those from the high drag stage. Similarly, the high drag stage may be configured as any type of high coefficient of drag or lifting parachute including, but not limited to, a gliding parachute, a parafoil, a ram air inflatable airfoil, a sailwing parachute, a volplane parachute, a single surface gliding parachute, a parawing, a circular parachute, conical parachute, biconical parachute, polyconical parachute, extended skirt parachute, hemispherical parachute, guide surface parachute, ringslot parachute, ringsail, rotafoil, Sandia RFD, disc-band-gap parachute, a cruciform parachute, a vortex ring parachute, a paracommander parachute, a toju style slotted parachute or other suitable high drag design which may or may not include control functionality.

EXAMPLES

The following examples are provided for illustrative purposes only and are not intended to limit the scope of the invention.

Example 1

The initial example compares the projected forces which would be experienced by a payload and parachute during three different types of staged or non-staged parafoil deployment. The first simulation concerns a hybrid parafoil embodiment with 2 reefings and three stages as shown in FIGS. 1-9. The second simulation illustrates a prior art parafoil deployment, without any hybrid modification and with no reefing resulting in single staged deployment. The third simulation illustrates a parafoil without the hybrid modification but featuring a slider-reefed deployment. All three types of deployment are simulated at 90,000 feet altitude and a speed of 400 mph (179 m/s).

FIG. 19 shows the forces involved in the opening of the three-stage hybrid embodiment. The simulation has the system being initially deployed into a high-speed deceleration stage, in the configuration seen in FIGS. 1 through 3. The first reefing stage is released 15 seconds after initial deployment, allowing the parafoil to open to the intermediate configuration seen in FIGS. 4-6. The final reefing is released 10 seconds after the first is released, allowing the parafoil to fully open into the high drag configuration seen in FIGS. 7-9. Pertinent projected force information is noted on the chart of FIG. 19. Key values shown on FIG. 19 are the maximum jerk and the maximum drag force. The maximum jerk calculated is approximately 380 N/s. The maximum drag force is projected to be approximately 108 N for the three stage hybrid design.

FIG. 20 shows the projected forces involved in the opening of an unreefed, prior art parafoil. Pertinent force information is noted on the chart. The same figures show a maximum jerk of approximately 2,528 N/s and a maximum drag force of approximately 538 N.

FIG. 21 shows the projected forces involved in the opening of a non-hybrid parafoil reefed with a solid textile slider. Pertinent force information is noted on the chart. The same key figures show a maximum jerk of approximately 907 N/s and a maximum drag force of approximately 214 N.

Since the final parachute configuration in all three deployments is the same, it is projected that the hybrid embodiment is a superior system for reducing the forces endured by the parachute system and payload under the stated conditions.

Example 2

This example compares the projected forces experienced by a hybrid round-variant parachute such as shown in FIGS.

10-18 with a standard round-variant of the same size. The Example 2 simulation features the deployment of both systems at 400 mph and 90,000 feet msl. The hybrid parachute simulation was performed with one reefing stage, between the ribbon parachute skirt and the solid textile parachute, as illustrated in FIGS. 10-18. The first deceleration stage is deployed at 25 seconds with the second high drag stage deployed at 40 seconds.

FIG. 22 shows the projected forces calculated for the opening of the reefed hybrid parachute of FIGS. 10-18. Pertinent force information is noted on the chart. Key values are the maximum jerk and the maximum drag force. The maximum jerk is approximately 1,534 N/s. The maximum drag force is approximately 339 N.

FIG. 23 shows the forces involved in the opening of an unreefed, prior art solid-textile conical parachute of the same size under the same conditions. Pertinent force information is noted on the chart. The same key values show a maximum jerk of approximately 10,024 N/s and a maximum drag force of approximately 2,037 N.

Since the final parachute configuration is the same in both the FIG. 22 and FIG. 23 projection, it is projected that the hybrid embodiment is a superior system for reducing the forces endured by the parachute system and payload under the stated conditions.

The foregoing description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A parachute comprising:
a high speed deceleration stage configured to be deployed initially; and
a high drag parafoil stage directly attached to the high speed deceleration stage wherein the high drag stage is configured to be substantially undeployed while the high speed deceleration stage is initially deployed and substantially completely deployed after the deceleration stage has slowed the parachute and with the deceleration stage forming a portion of the deployed high drag parafoil stage;
wherein the high speed deceleration stage is a non-parafoil parachute form and upon deploying the high drag parafoil stage, the parachute flight is controlled by the high drag parafoil stage.

2. The parachute of claim 1 wherein the parachute is reefed between the deceleration stage and the high drag stage so that only the deceleration stage will be opened prior to release of a reefing.

3. The parachute of claim 2 wherein at least one of the deceleration stage and the high drag stage is further reefed for multiple stage deployment.

4. The parachute of claim 1 wherein a slider is used to control the opening of the deceleration stage and/or the high drag stage.

5. The parachute of claim 1 wherein an autonomous system is used to control the timing between the opening of the deceleration stage and the high drag stage.

6. The parachute of claim 1 wherein a remote control system is used to control the timing between the opening of the deceleration stage and the high drag stage.

7. The parachute of claim 1 wherein a manual system is used to control the timing between the opening of the deceleration stage and the high drag stage.

8. The parachute of claim 1 wherein an autonomous system is used to control the operation of the parachute after at least one of the deceleration stage and the high drag stage has opened.

9. The parachute of claim 1 wherein a remote control system is used to control the operation of the parachute after at least one of the deceleration stage and the high drag stage has opened.

10. The parachute of claim 1 wherein a manual system is used to control the operation of the parachute after at least one of the deceleration stage and the high drag stage has opened.

11. The parachute of claim 1 wherein the deceleration stage comprises a solid textile, ribbon, guide surface, ringslot, ballute, or other high-speed deployable design.

12. The parachute of claim 1 wherein a select portion of the high drag stage is modified to function as the deceleration stage.

13. The parachute of claim 1 wherein the high drag stage comprises a single surface gliding parachute.

14. The parachute of claim 13 wherein the single surface gliding parachute comprises a parawing parachute.

15. The parachute of claim 13 wherein a lateral edge of the single surface gliding parachute is modified to function as the deceleration stage.

16. The parachute of claim 15 wherein the deceleration stage comprises a solid textile, ribbon, guide surface, ringslot, ballute, or other high-speed deployable design.

17. A method of deploying a parachute comprising:
deploying a high speed deceleration stage initially; and
deploying a high drag parafoil stage directly attached to the high speed deceleration stage after deployment of the deceleration stage;
wherein the high drag parafoil stage is configured to be substantially undeployed while the high speed deceleration stage is initially deployed and substantially completely deployed after the deceleration stage has slowed the parachute and with the deceleration stage forming a portion of the deployed high drag parafoil stage; and
wherein the high speed deceleration stage is a non-parafoil parachute form and upon deploying the high drag parafoil stage, the parachute flight is controlled by the high drag parafoil stage.

18. The method of deploying a parachute of claim 17 further comprising:
providing a reefing between the deceleration stage and the high drag stage; and
releasing the reefing to deploy the high drag stage.

19. The method of deploying a parachute of claim 18 further comprising deploying at least one of the deceleration stage and the high drag stage in multiple stages of deployment.

20. The method of deploying a parachute of claim 18 further comprising controlling the timing between the deployment deceleration stage and the high drag stage with one of an autonomous system, a remote control system or a manual system.

21. The parachute of claim 18 wherein a slider is used to control the opening of the deceleration stage and/or the high drag stage.

22. The method of deploying a parachute of claim 18 further comprising controlling the operation of the parachute with one of an autonomous system, a remote control system or a manual system.

23. A method of landing a payload comprising:
   attaching the payload to a parachute having more than one stage;
   deploying a high speed deceleration stage initially; and
   deploying a high drag parafoil stage directly attached to the high speed deceleration stage after deployment of the deceleration stage;
   wherein the high drag parafoil stage is configured to be substantially undeployed while the high speed deceleration stage is initially deployed and substantially completely deployed after the deceleration stage has slowed the parachute and with the deceleration stage forming a portion of the deployed high drag parafoil stage; and
   wherein the high speed deceleration stage is a non-parafoil parachute form and upon deploying the high drag parafoil stage, the parachute flight is controlled by the high drag parafoil stage.

24. The method of landing a payload of claim 23 further comprising:
   providing a reefing between the deceleration stage and the high drag stage; and
   releasing the reefing to deploy the high drag stage.

25. The method of landing a payload of claim 23 further comprising deploying at least one of the deceleration stage and the high drag stage in multiple stages of deployment.

26. The method of landing a payload of claim 23 further comprising controlling the timing between the deployment deceleration stage and the high drag stage with one of an autonomous system, a remote control system or a manual system.

27. The parachute of claim 23 wherein a slider is used to control the opening of the deceleration stage and/or the high drag stage.

28. The method of landing a payload of claim 23 further comprising controlling the operation of the parachute with one of an autonomous system, a remote control system or a manual system.

* * * * *